(12) United States Patent
Isobe et al.

(10) Patent No.: US 8,050,667 B2
(45) Date of Patent: Nov. 1, 2011

(54) VIRTUAL TERMINAL SERVER, MOBILE COMMUNICATION TERMINAL, COMMUNICATION CONTROL SYSTEM, AND COMMUNICATION CONTROL METHOD

(75) Inventors: Shin-ichi Isobe, Yokosuka (JP); Takuji Sakaguchi, Yokohama (JP); Masami Yabusaki, Kashima (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 367 days.

(21) Appl. No.: 12/273,786

(22) Filed: Nov. 19, 2008

(65) Prior Publication Data

US 2009/0131031 A1   May 21, 2009

(30) Foreign Application Priority Data

Nov. 19, 2007 (JP) ................. 2007-298915

(51) Int. Cl.
*H04M 3/00* (2006.01)
(52) U.S. Cl. ........................ 455/418; 455/423
(58) Field of Classification Search .............. 455/423, 455/418
See application file for complete search history.

(56) References Cited

U.S. PATENT DOCUMENTS

| | | | |
|---|---|---|---|
| 2002/0156833 A1 | 10/2002 | Maurya et al. | |
| 2003/0145044 A1* | 7/2003 | Raivisto et al. | 709/203 |
| 2003/0236089 A1* | 12/2003 | Beyme et al. | 455/423 |
| 2007/0297596 A1 | 12/2007 | Matsubara | |

FOREIGN PATENT DOCUMENTS

| | | |
|---|---|---|
| JP | 11-288403 | 10/1999 |
| JP | 2005-277654 A | 10/2005 |
| JP | 2007-179108 A | 7/2007 |
| JP | 2007-281865 A | 10/2007 |
| JP | 2008-5308 A | 1/2008 |
| WO | WO 02/23857 A2 | 3/2002 |
| WO | WO 2006/101604 A2 | 9/2006 |

OTHER PUBLICATIONS

Erik Vanem, et al., "Virtual Terminal as an XML Web Service", Proceedings of the 14th International Workshop on Database and Expert Systems Applications, pp. 225-229, Sep. 2003, Piscataway, NJ, XP010658137.
European Search Report.

* cited by examiner

*Primary Examiner* — Lester Kincaid
*Assistant Examiner* — Isaak R Jama
(74) *Attorney, Agent, or Firm* — Crowell & Moring LLP

(57) ABSTRACT

In order to provide a new service even to a conventional mobile communication terminal without installing a new function when starting a new mobile communication service, a mobile communication terminal includes a virtual terminal server that controls the communication on behalf of the mobile communication terminal according to a request from the mobile communication terminal to realize a service function that is a communication function not included in the mobile communication terminal. The virtual terminal server processes, in accordance with the model information of the mobile communication function, information to be informed to the mobile communication terminal to realize the service function to thereby enable the mobile communication terminal to acquire and transmit information obtained by realizing the service function.

6 Claims, 12 Drawing Sheets

F I G. 1
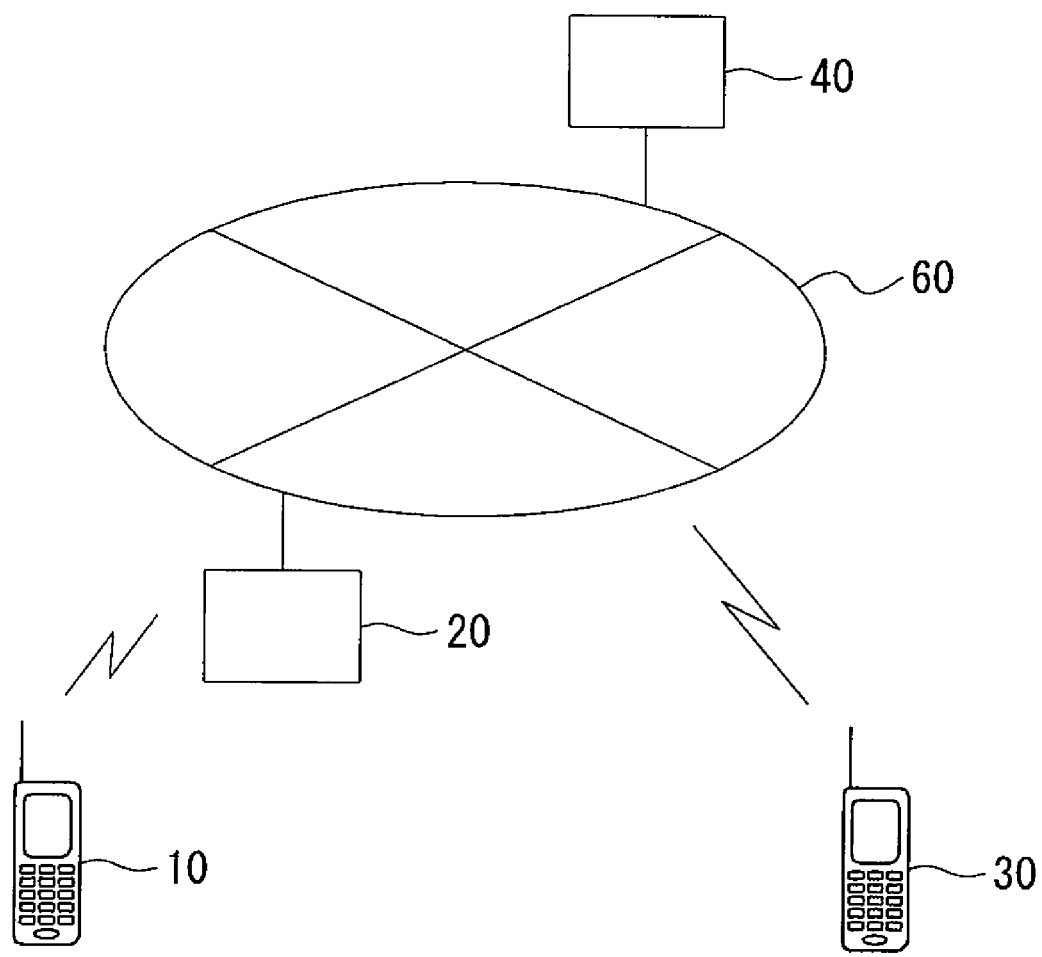

FIG. 5

| USER ID | 090xxxxxxxxx |
|---|---|
| MODEL INFORMATION | XX904i |
| SCREEN SIZE | 2.8 INCHES |
| RESOLUTION | 320 × 240 (QVGA) |
| FRAMES PER SECOND | 30 FRAMES/SECOND |

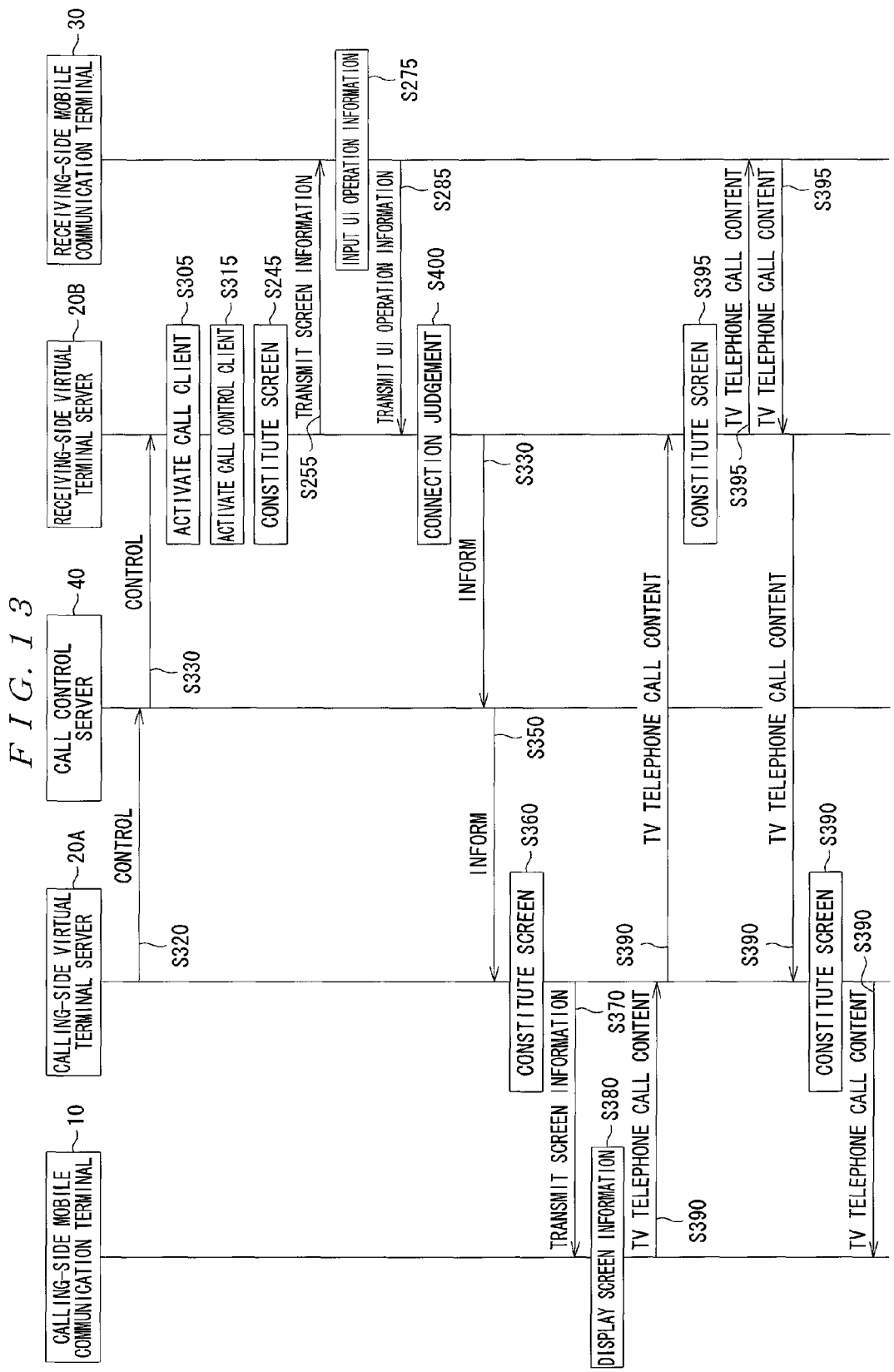

VIRTUAL TERMINAL SERVER, MOBILE COMMUNICATION TERMINAL, COMMUNICATION CONTROL SYSTEM, AND COMMUNICATION CONTROL METHOD

BACKGROUND OF THE INVENTION

1. Field of the Invention

The present invention relates to a virtual terminal server, a mobile communication terminal, a communication control system, and a communication control method for providing a communication service using a mobile communication terminal such as a communication service for providing mutual communication between a plurality of terminals in a communication network.

2. Description of the Related Art

In the mobile communication, a communication control message corresponding to a communication service (communication function) is transmitted and received between mobile communication terminals, and a communication path between the terminals is set to allow communication between the mobile communication terminals.

JP 2005-277654 A describes a communication control system between mobile communication terminals using a virtual terminal device.

The communication control system described in JP 2005-277654 A includes a mobile communication terminal connected to an audio network and the data network, a virtual terminal device connected to the audio network and the data network, and a communication partner device connected to the virtual terminal device.

The virtual terminal device includes: application processing means for interpreting user data received from the communication partner device and distributing the data into an audio signal and an image signal; virtual screen means for developing the image signal on a virtual screen; and synchronization processing means for providing a synchronization signal to the audio signal and the image signal, transmitting the audio signal to the audio network, and transmitting the image signal to the data network.

The mobile communication terminal includes synchronization processing means for synchronizing the audio signal received through the audio network and the image signal received through the data network, audio device means for producing sound of the audio signal, and image device means for displaying the image signal.

The mobile communication terminal further includes input device means for acquiring an operation of the user and input processing means for transmitting the operation to the data network as an input signal.

The virtual terminal device further includes input processing means for informing the operation that can be obtained from the input signal to the application processing means. The application processing means is designed to interpret the operation and request user data to the communication partner device.

In this way, the conventional technique is intended to suppress the processing load in the mobile communication terminal.

In the conventional technique, an application processing unit that processes an audio signal and an image signal is installed in the virtual terminal device, whereas the application processing unit is usually included in the mobile communication terminal. Instead, the synchronization processing means is installed in both of the mobile communication terminal and the virtual terminal device to allow processing of the audio signal and the image signal.

Thus, in the conventional technique, the application processing unit that processes the audio signal and the image signal and that is usually required to be installed in the mobile communication terminal is simply installed in the virtual terminal device to reduce the processing load of the mobile communication terminal. Therefore, in the conventional technique, an application for providing additional services of various communication functions is not installed in the virtual terminal.

When providing a service including a new communication function, transmission and reception of a communication control message corresponding to the service is necessary between the mobile communication terminals. A corresponding screen display format or the like also needs to be prepared in the mobile communication terminal. Therefore, in general, the new function is definitely required in the mobile communication terminal to provide the new service. The new service cannot be provided to the conventional mobile communication terminal which does not include the function.

Even in the conventional technique, an additional function of the mobile communication terminal is needed to provide a new communication service.

SUMMARY OF THE INVENTION

The present invention has been made in view of the above circumstances, and has an object of providing a new service even in a conventional mobile communication terminal without installing a new function when starting a new mobile communication service.

To solve the problems, According to another aspect of the present invention, there is provided a server connectable to a mobile communication terminal through a communication network, the server comprising:

identification information acquiring means for acquiring identification information related to at least one of the mobile communication terminal and a user of the mobile communication terminal from the mobile communication terminal; activation request acquiring means for acquiring activation information related to an activation request of an application including a communication function from the mobile communication terminal; communication control means for performing a communication connection control on behalf of the mobile communication terminal to realize the application including the communication function corresponding to the activation information acquired by the activation request acquiring means; and screen constituting means for processing, after acquiring or generating screen information to be displayed in the mobile communication terminal by executing the application including the communication function, the acquired or generated screen information to screen information suitable for the screen performance of the mobile communication terminal based on the identification information and outputting the screen information, to the mobile communication terminal.

The above virtual terminal server may further comprise operation processing means for analyzing, upon receipt of operation information from the mobile communication terminal during the execution of the application including the communication function, the received operation information in accordance with the application that includes the communication function being performed and executing a process in accordance with an analysis result.

In the above virtual terminal server, the activation request acquiring means may transmit, to a mobile communication terminal, information of an application including a communication function that can be provided in accordance with a request from the mobile communication terminal, and may acquire selection information from the mobile communication terminal to thereby acquire activation information of the application including the communication function to which the activation is requested.

According to another aspect of the present invention, there is provided a mobile communication terminal that connectable to the above virtual terminal server, the mobile communication terminal comprising: remote connection means for outputting to the virtual terminal server a connection request for an application including a communication function not installed in a calling-side mobile communication terminal; input information transmitting means for transmitting to the virtual terminal server operation information including at least one of button operation information and information indicative of a location in a screen of the calling-side mobile communication terminal related to acquired information; and screen display means for displaying the screen information received from the virtual terminal server.

According to another aspect of the present invention, there is provided a communication control system comprising: the above virtual terminal server; a mobile communication terminal that is connected to the virtual terminal server through a communication network and that entrusts to the virtual terminal server communication control of a communication function not included in a calling-side mobile communication terminal; and a communication control server that controls the connection between the virtual terminal server and another mobile communication terminal.

According to another aspect of the present invention, there is provided a communication control method comprising a virtual terminal server that controls communication on behalf of a mobile communication terminal in accordance with a request from the mobile communication terminal for the mobile communication terminal to realize an individual service that is a communication function not included in the mobile communication terminal, wherein the virtual terminal server processes information to be informed to the mobile communication terminal to realize the individual service in accordance with model information of the mobile communication terminal to thereby enable the mobile communication terminal to output information in accordance with the individual service.

The virtual terminal server performs the communication connection control on behalf of the mobile communication terminal such that the application (communication service) including the communication function requested by the mobile communication terminal can be executed. As a result, a new service can be provided to the mobile communication terminal not including the communication function as if the communication function were included.

Therefore, the new service can be provided even to the conventional mobile communication terminal without installing a new function to start a new mobile communication service.

As seen in the above mobile communication terminal, the remote connection means for outputting, to the virtual terminal server, a connection request for the communication function not included in the calling-side mobile communication terminal is installed in the mobile communication terminal, thereby allowing connection between the mobile communication terminal and the virtual terminal server and attaining the above effects.

BRIEF DESCRIPTION OF THE DRAWINGS

FIG. 1 is a schematic block diagram of a communication control system according to a first embodiment of the present invention;

FIG. 5 depicts an example of identification information held by a model discriminating unit 211 in the virtual terminal server according to the first embodiment of the present invention;

FIG. 13 is a flow chart of an operation from the start to the end of the communication of a TV telephone in the communication control system according to the second embodiment of the present invention.

DETAILED DESCRIPTION OF THE PREFERRED EMBODIMENTS

First Embodiment

Embodiments of the present invention will now be described with reference to the drawings.

In the present embodiment, a communication system capable of performing group communication such as Push over Cellular function will be described as an example. However, the present invention is not limited to the application for the group communication system.

(Configuration)
(Configuration of the Entire System)

A configuration of the group communication system according to a first embodiment of the present invention will be described.

FIG. 1 is a schematic block diagram of an overview of the communication control system according to the present embodiment.

Figure 2:
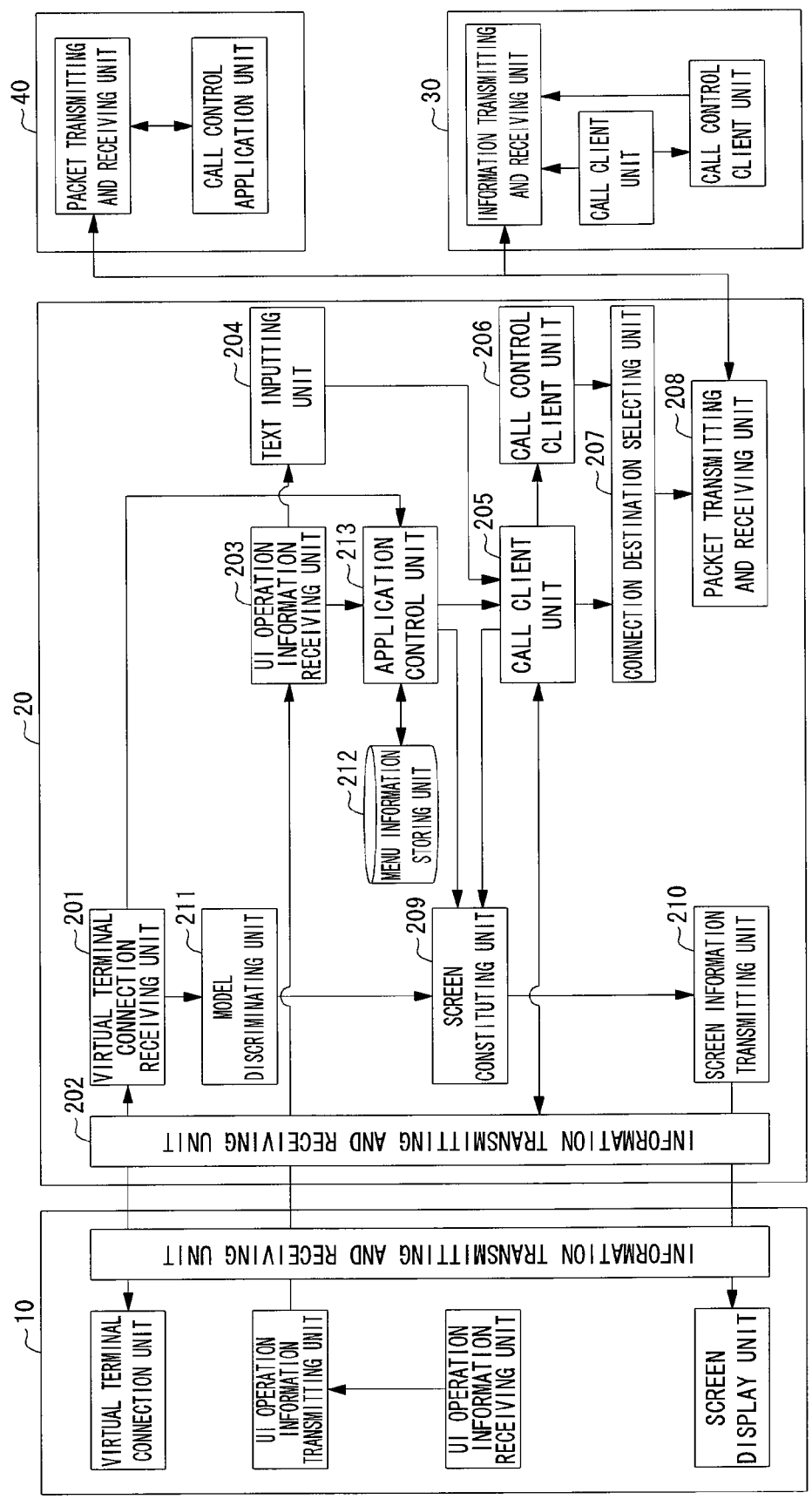
FIG. 2 depicts an overall architecture of the communication control system according to the first embodiment of the present invention.

FIG. 2 is an architecture diagram of the communication control system according to the present embodiment.

The communication control system according to the present embodiment includes: a virtual terminal server 20 that controls communication on behalf of a mobile communication terminal 10; a mobile communication terminal 10 that connects to the virtual terminal server 20 through a communication network 60 and that entrusts the communication control to the virtual terminal server 20; a mobile communication terminal 30 that provides the communication control in a calling-side mobile communication terminal; and a communication control server (call control server 40) that controls the connection between the virtual terminal server 20 and the mobile communication terminal 30. The mobile communication terminals 10 and 30 are connected to the communication network 60 through a base station, not shown. The mobile communication terminal 30 may also be a mobile communication terminal that connects to the virtual terminal server through the communication network 60 and that entrusts the communication control to the virtual terminal server 20. An example of the implementation will be described in a second embodiment of the present invention.
(Configuration of Mobile Communication Terminal With Virtual Terminal Function)

A configuration of the mobile communication terminal 10 with a virtual terminal function will be described.

Figure 3:
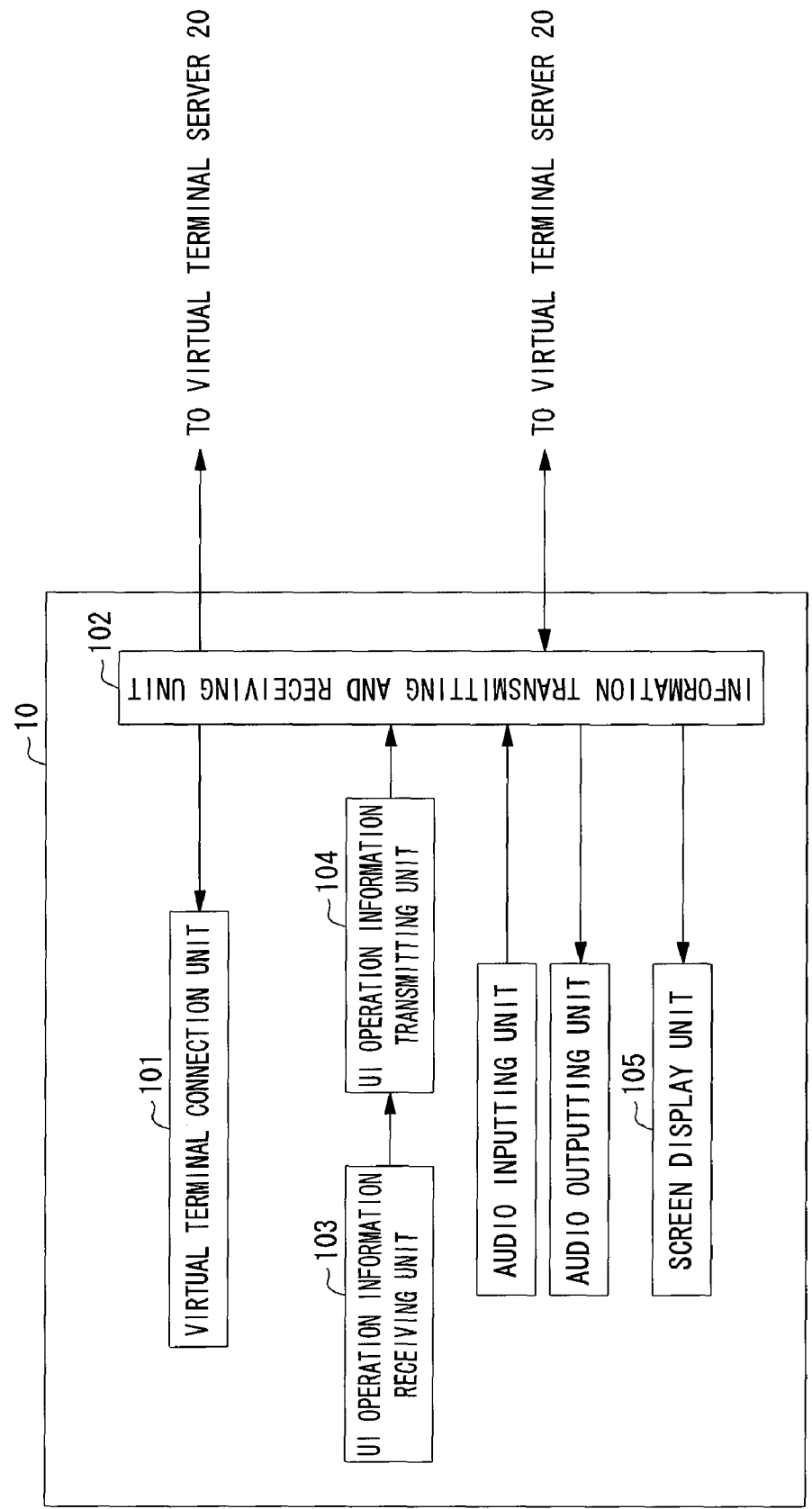
FIG. 3 is a configuration diagram of a mobile communication terminal 10 with a virtual terminal function according to the first embodiment of the present invention.

FIG. 3 is a configuration diagram of the mobile communication terminal 10 with a virtual terminal function according to a second embodiment of the present invention.

As shown in FIG. 3, the mobile communication terminal 10 with a virtual terminal function includes: an information transmitting and receiving unit 102; a virtual terminal connection unit 101 that requests a connection with the virtual terminal server 20; a UI operation information receiving unit 103; a UI operation information transmitting unit 104; and a screen display unit 105.

The information transmitting and receiving unit 102 is a functional unit that serves as an interface for transmitting and receiving a signal with the virtual terminal server 20. The information transmitting and receiving unit 102 receives, from the UI operation information transmitting unit 104, inputs information from the UI operation information receiving unit 103, and transmits the input information to the virtual terminal server 20. The information transmitting and receiving unit 102 also transmits information received from the virtual terminal server 20 to the screen display unit 105.

The virtual terminal connection unit 101 is designed to control the connection with the virtual terminal server 20 when the mobile communication terminal 10 with a virtual terminal function performs a communication service (application) including a communication function not installed in the mobile communication terminal 10.

When activated, the virtual terminal connection unit 101 transmits authentication information that enables the virtual terminal server 20 to authenticate the mobile communication terminal 10 with the virtual terminal function and identification information of the mobile communication terminal 10 with the virtual terminal function to the virtual terminal server 20.

In the virtual terminal connection unit 101, for example, a functional unit may be constructed with hardware such as an IC chip, and an operation button for activating the virtual terminal connection unit 101 may be arranged on the mobile communication terminal 10 with a virtual terminal function. The function of the virtual terminal connection unit 101 may be provided by a software program, which may be included as application software in the mobile communication terminal 10 with a virtual terminal function. When arranging the function of the virtual terminal connection unit 101 as application software, if possible, a mobile communication terminal may be designed to serve as the mobile communication terminal 10 with a virtual terminal function by downloading the application software onto the mobile communication terminal.

The UI operation information receiving unit 103 includes an operation unit such as a button and a touch panel. The UI operation receiving unit 103 acquires input information inputted by the user operating the operation unit, and transfers the input information to the UI operation information transmitting unit 104.

The UI operation information transmitting unit 104 transmits the input information received from the UI operation information receiving unit 103 through the information transmitting and receiving unit 102.

The screen display unit 105 displays screen information received through the information transmitting and receiving unit 102.

As in a conventional mobile communication terminal, an audio processing unit (audio inputting unit and audio outing unit) such as a speaker and a microphone is included, which outputs sound received through the information transmitting and receiving unit 102 and which is capable of transmitting inputted audio information through the information transmitting and receiving unit 102.
(Configuration of Virtual Terminal Server 20)

A configuration of the virtual terminal server 20 will be described.

Figure 4:
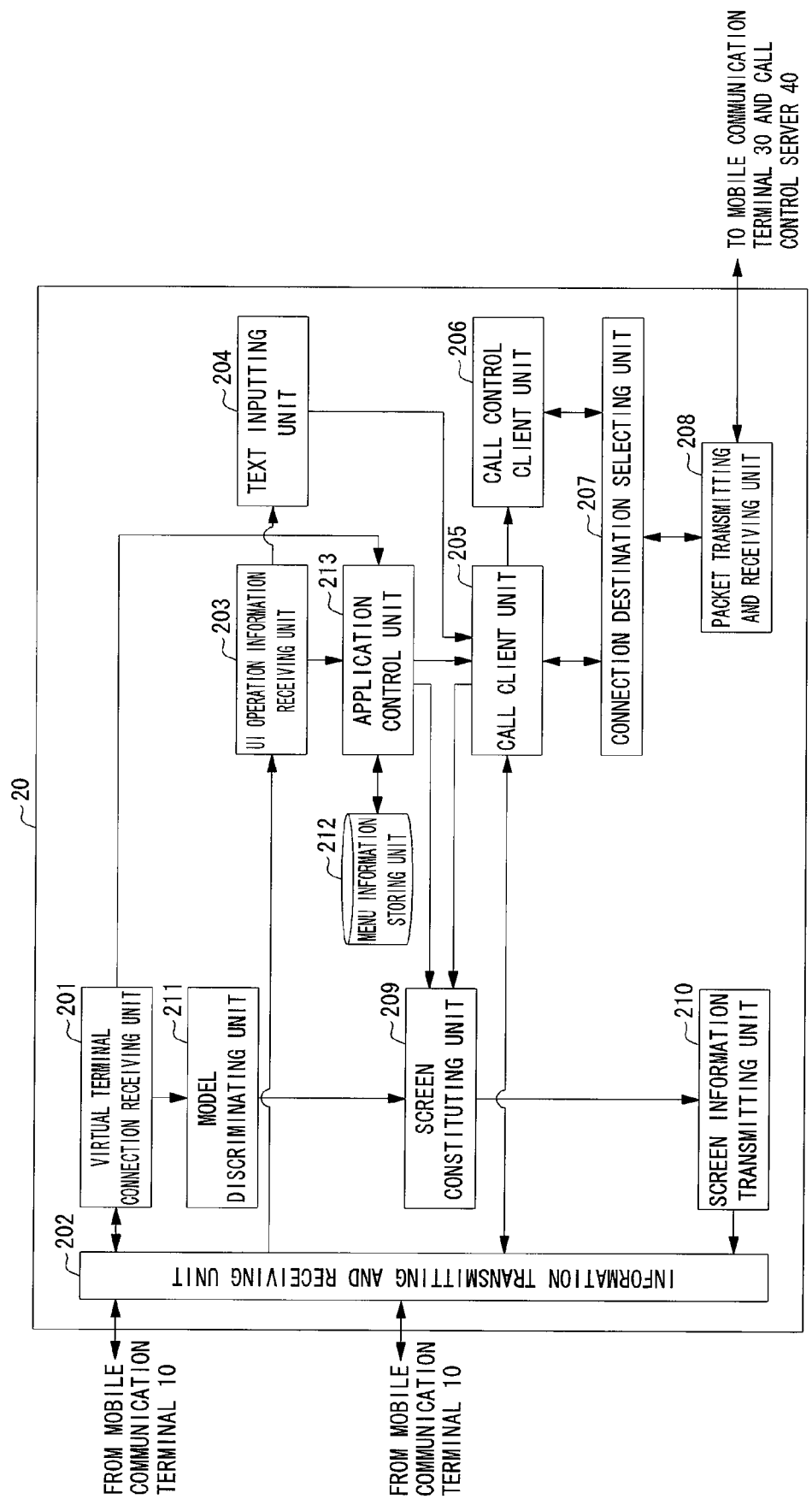
FIG. 4 is a configuration diagram of a virtual terminal server according to the first embodiment of the present invention.

FIG. 4 is a schematic block diagram of a configuration of the virtual terminal server 20 according to the present embodiment.

The virtual terminal server 20 includes an information transmitting and receiving unit 202, a virtual terminal connection receiving unit 201, a UI operation information receiving unit 203, a text inputting unit 204, a call client unit 205, a call control client unit 206, a connection destination selecting unit 207, a packet transmitting and receiving unit 208, a screen constituting unit 209, a screen information transmitting unit 210, a model discriminating unit 211, a menu information storing unit 212, and an application control unit 213.

The information transmitting and receiving unit 202 is an interface unit that transfers a signal with the mobile communication terminal 10 with a virtual terminal function.

The information transmitting and receiving unit 202 receives, for example, UI operation information from the mobile communication terminal 10 with a virtual terminal function, and transfers the information to the UI operation information receiving unit 203. The information transmitting and receiving unit 202 also transmits screen including information received from the screen information transmitting unit 210 and sound or images received from the call client unit 205 to the mobile communication terminal 10 with a virtual terminal function.

The virtual terminal connection receiving unit 201 controls the connection with the mobile communication terminal 10 with a virtual terminal function.

The virtual terminal connection receiving unit 201 acquires authentication information and identification information from the virtual terminal connection unit 101 of the mobile communication terminal 10 with a virtual terminal function and acquires information for authenticating the mobile communication terminal 10 with a virtual terminal function and discriminating the model of the mobile communication terminal.

More specifically, after the virtual terminal connection receiving unit 201 receives from the mobile communication terminal 10 with a virtual terminal function the authentication information that allows authentication of the mobile communication terminal 10 with a virtual terminal function, the virtual terminal connection receiving unit 201 authenticates whether the mobile communication terminal is connectable. If the authentication is not possible, a new function service is not provided. If the mobile communication terminal is authenticated to be connectable, the connection with the mobile communication terminal 10 with a virtual terminal function is established. When the connection with the mobile communication terminal 10 with a virtual terminal function is completed, the completion of the connection is informed to the application control unit 213.

The virtual terminal connection receiving unit 201 also receives the identification information of the mobile communication terminal 10 with a virtual terminal function, and transfers the identification information to the model discriminating unit 211.

The UI operation information receiving unit 203 receives the input information transmitted by the UI operation information transmitting unit 104, as UI operation information through the information transmitting and receiving unit 202. The UI operation information receiving unit 203 then classifies the received UI operation information into text input information and screen operation information that is determined by pressing the operation button. Subsequently, the UI operation information receiving unit 203 transmits the text input information to the text inputting unit 204, and transfers screen operation information (such as location information selected on the display screen) to the application control unit 213.

Upon receipt of the text information from the UI operation information receiving unit 203, the text inputting unit 204 interprets the text and transfers the interpreted text information to the call client unit 205.

Upon receipt of the text information interpreted by the text inputting unit 204, the call client unit 205 transfers the text information to the screen constituting unit 209. This allows the screen display unit of the mobile communication terminal 10 with a virtual terminal function to display the text information inputted by the user.

Upon receipt of an application activation instruction from the application control unit 213, the call client unit 205 activates a call client (application) corresponding to a communication function selected in the mobile communication terminal 10 with a virtual terminal function. The call client unit 205 further transmits a communication control instruction to the call control client unit 206.

The call client unit 205 also transfers, to the connection destination selecting unit 207, data of sound or images received through the information transmitting and receiving unit 102 to transfer the data to the mobile communication terminal 30.

The call client unit 205 further transfers the sound received from the connection destination selecting unit 207 to the information transmitting and receiving unit 102 and transfers screen information such as an image to the screen constituting unit 209.

The call control client unit 206 starts the communication control with the mobile communication terminal 30 in accordance with the communication control instruction from the call client unit 205. More specifically, the call control client unit 206 creates a communication control message and transfers the message to the packet transmitting and receiving unit 208. The call control client unit 206 receives the communication control message from the packet transmitting and receiving unit 208. In this manner, the call is controlled by exchanging the communication control message between the call control server 40 and the mobile communication terminal 30 on behalf of the mobile communication terminal 10 with a virtual terminal function.

To add a service (application) including a new communication function, a new call client is added to the call client unit 205, or a new call control client for controlling the call corresponding to the communication function is added to the call control client unit 206. The call client or the call control client serves as an application corresponding to the communication function.

The connection destination selecting unit 207 distributes the data received from the call client unit 205 and the call control client unit 206 to transfer the data to the mobile communication terminal 30 to be communicated with or the call control server 40, and then transfers the data to the packet transmitting and receiving unit 208. The connection destination selecting unit 207 transfers user data such as sound and images among the data received from the packet transmitting and receiving unit 208 to the call client unit 205, and in addition, transfers the communication control message to the call control client unit 206.

The model discriminating unit 211 receives the identification information of the mobile communication terminal 10 with a virtual terminal function from the virtual terminal connection receiving unit 201, and discriminates the model of the mobile communication terminal. The model discriminating unit 211 informs the screen constituting unit 209 of information on screen specifications (such as screen size and image quality) of the mobile communication terminal 10 with a virtual terminal function based on the information of the discriminated model.

FIG. 5 shows an example of the identification information managed by the model discriminating unit 211. FIG. 5 depicts an example of the identification information held by the model discriminating unit 211 in the communication control server or in the virtual terminal server 20 of the present embodiment. Preferably, as shown in FIG. 5, the model discriminating unit 211 holds user ID, model information, screen size, resolution, and frames per second. Preferably, the identification information exchanged between the virtual terminal connection receiving unit 201 and the mobile communication terminal 10 with a virtual terminal function is registered. Only the model information or the user ID may be provided as the information acquired from the mobile communication terminal 10 with a virtual terminal function. Necessary information may be separately acquired and registered with reference to a management table of the model and the information on screen specifications or with reference to a user management database.

The packet transmitting and receiving unit 208 transfers the data received from the connection destination selecting unit 207 to each mobile communication terminal 30 to be communicated with. The packet transmitting and receiving unit 208 also transfers the data received from each mobile communication terminal 30 to be communicated with to the connection destination selecting unit 207. The packet transmitting and receiving unit 208 exchanges the communication control message between the call control server 40 and the mobile communication terminal 30 to be communicated with to control the call on behalf of the mobile communication terminal 10 with a virtual terminal function.

The screen constituting unit 209 processes the screen received from the call client unit 205 according to the information on screen specifications received from the model discriminating unit 211 to constitute a screen corresponding to the screen specifications. The screen constituting unit 209 then transfers the constituted screen information to the screen information transmitting unit 210.

The screen information transmitting unit 210 transmits the screen information constituted by the screen constituting unit 209 to the connected mobile communication terminal 10 with a virtual terminal function through the information transmitting and receiving unit 202.

The menu information storing unit 212 stores menu information. In accordance with the access from the application control unit 213, the menu information storing unit 21 transfers application information corresponding to the relevant screen information or the activated communication function.

Figure 6:
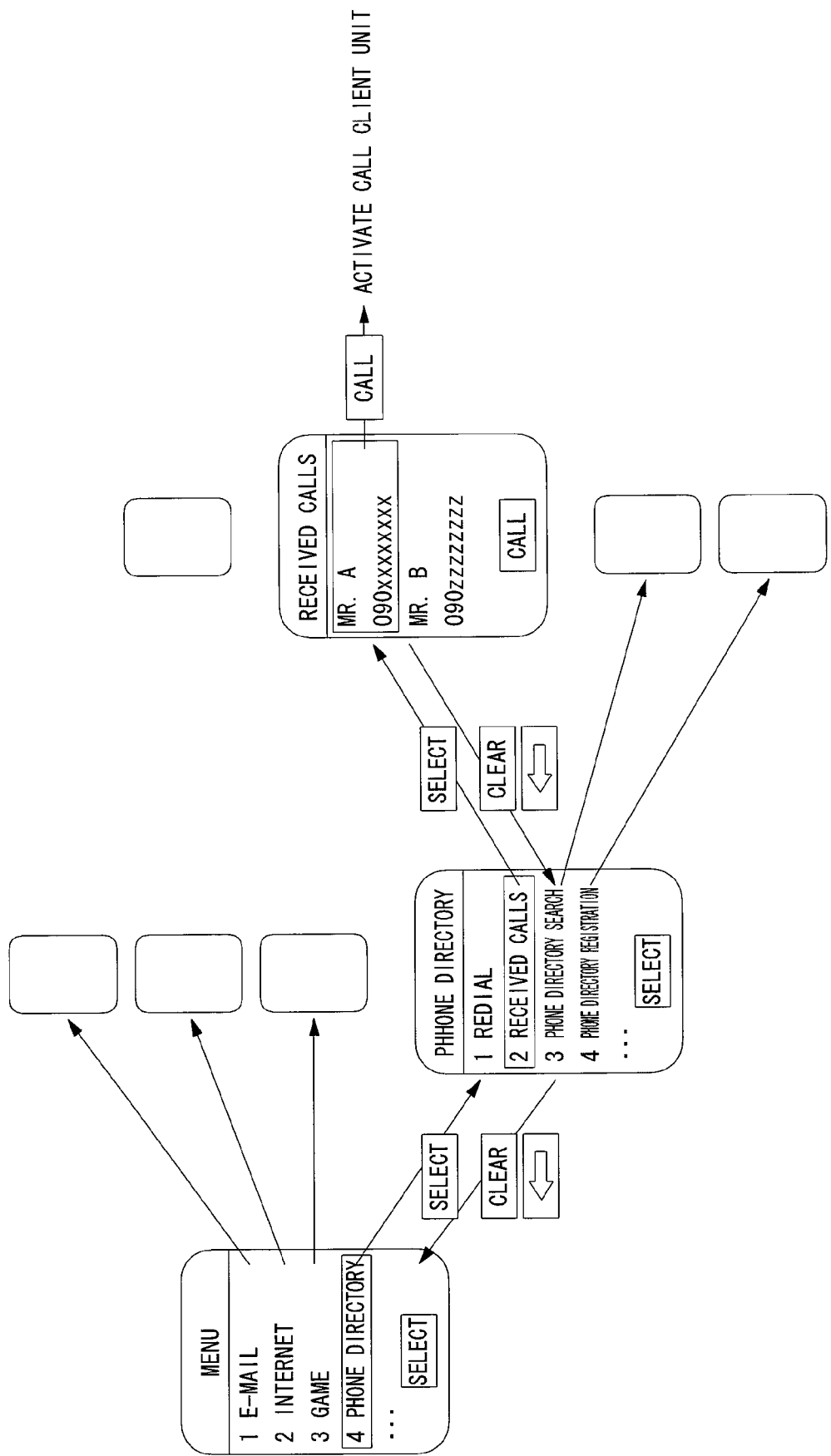
FIG. 6 depicts an example of information held by a menu information storing unit 212 in the virtual terminal server according to the first embodiment of the present invention.

FIG. 6 shows an example of information held by the menu information storing unit 212.

As shown in FIG. 6, a menu screen displayed on the screen of the mobile communication terminal 10 with a virtual terminal function is registered in the menu information storing unit 212. The menu screen is managed in association with a state transition indicating to which screen the transition is made when a certain button is operated. Ultimately, the menu information storing unit 212 manages an instruction to activate a client unit, such as the call client unit 205 that controls applications when a button for activating an application for transmission or the like is selected.

Once the application control unit 213 is informed of the completion of the connection with the mobile communication terminal 10 with a virtual terminal function from the virtual terminal connection receiving unit 201, the application control unit 213 extracts an initial menu screen from the menu information storing unit 212 and transfers the screen to the screen constituting unit 209. After that, the application control unit 213 manages information indicating to which menu screen each mobile communication terminal 10 with a virtual terminal function is currently making a transition. When receiving the screen operation information from the UI operation information receiving unit 203, the application control unit 213 checks, from the menu information storing unit 212, the state of the next transition to be made. The application control unit 213 transfers the information to the screen constituting unit 209 in a case of the menu screen information, and instructs the call client unit 205 to activate an application in a case of the instruction for activating the client unit.

Figure 7:
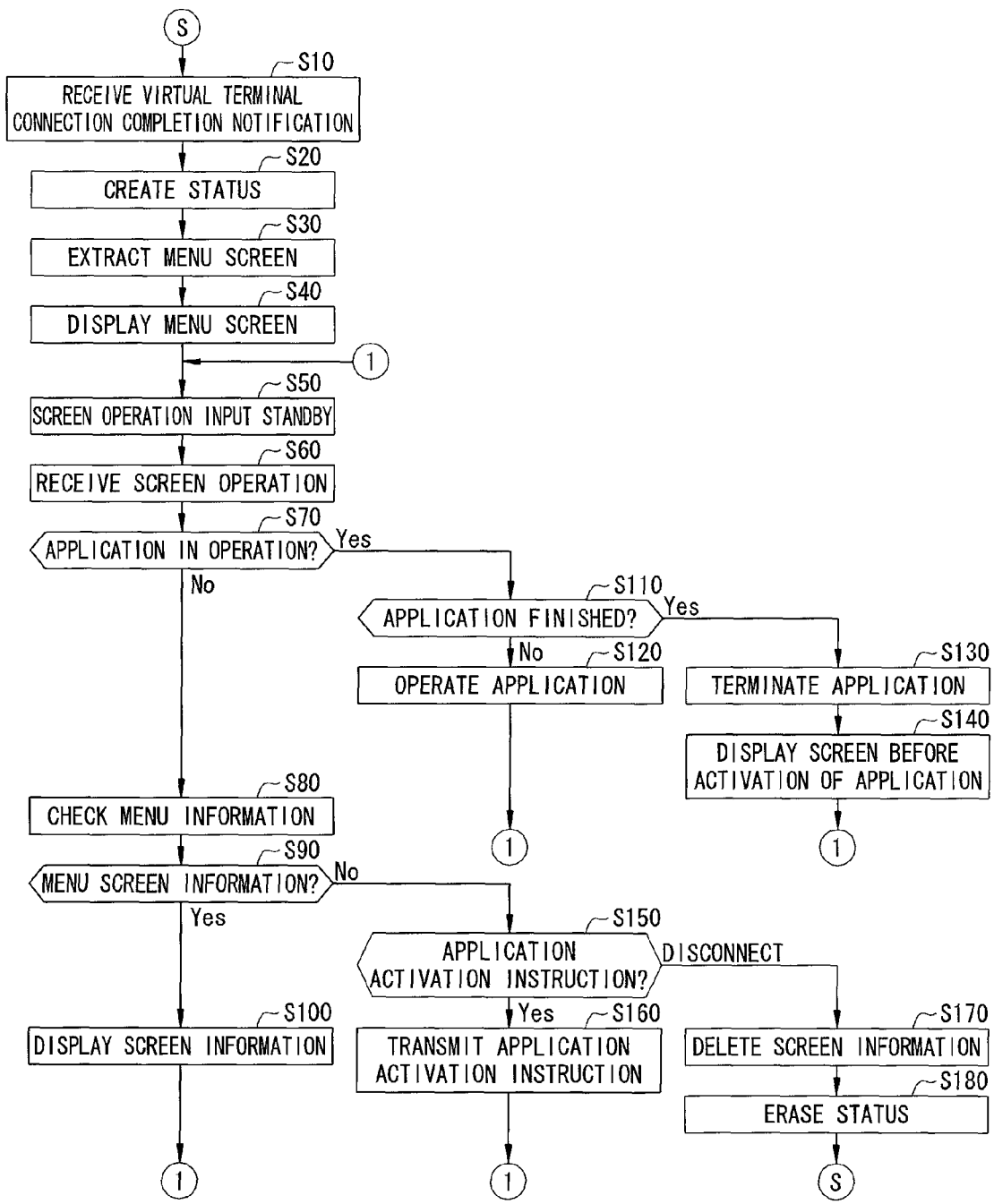
FIG. 7 depicts an example of processing by an application control unit in the virtual terminal server 20 according to the first embodiment of the present invention.

An example of the process of the application control unit 213 will be further described with reference to FIG. 7.

In the example, the application control unit 213 starts operation when the completion of the remote connection with the mobile communication terminal is informed from the virtual terminal connection receiving unit 201 (step S10).

Upon receipt of the notification, the application control unit 213 creates and manages the status of each mobile communication terminal connected to the virtual terminal server 20 (step S20). The status denotes a state transition diagram shown in FIG. 6, which manages to which screen the transition is currently being made.

After the creation of the status is completed, the application control unit 213 extracts the initial menu screen from the menu information storing unit 212 (step S30).

The application control unit 213 transfers the extracted menu screen to the screen constituting unit 209 to display the menu screen in the mobile communication terminal 10 (step S40).

After the initial menu screen is transmitted to the mobile communication terminal 10, the application control unit 213 waits for an input of the screen operation information from the mobile communication terminal 10 (step S50).

Once the screen operation information is inputted from the mobile communication terminal 10, the application control unit 213 receives the information from the UI operation information receiving unit 203 to accept the input information (step S60).

The application control unit 213 then checks the status of each mobile communication terminal 10, and also checks whether an application is already activated (step S70).

If the application is not yet activated, the application control unit 213 determines that the application is in the middle of being selected from the menu screen, and then checks information in the case of the transition from the screen currently displayed on the mobile communication terminal 10 to the inputted operation information, from the menu information storing unit 212 (step S80).

The application control unit 213 then checks whether the checked information is still the menu screen (step S90).

If the transited state is still the menu screen, the application control unit 213 extracts the menu screen and displays the menu screen on the mobile communication terminal 10 (step S100). After the screen information is displayed on the mobile communication terminal 10, the application control unit 213 waits for a screen operation input.

In step S70, if the application is already in operation when whether the application is in operation is checked, the application control unit 213 checks whether the inputted operation is an operation for terminating the application (step S110).

If the input operation checked in step S110 is not an operation for terminating the application, the application control unit 213 determines that this is an operation of the application, transfers the operation information to the call client unit 205, and activates the application (step S120). After the operation information is transferred to the call client unit 205, the application control unit 213 waits for a screen operation input.

If the input operation checked in step S110 is an operation for terminating the application, the application control unit 213 transmits an instruction for terminating the application to the call client 205 to terminate the application (step S130).

After the application is finished, the application control unit 213 extracts the menu screen before the activation of the application from the menu information storing unit 212 and displays the menu screen in the mobile communication terminal 10 (step S140). The application control unit 213 then waits for a screen operation input.

Whether the information checked by the menu information storing unit 212 is the menu screen is checked in step 90. If the result of checking does not indicate the menu screen, the application control unit 213 checks whether the result indicates an instruction for activating the application (step S150).

If the content checked in step S150 is an instruction for activating the application, the application control unit 213 transmits an application activation instruction to the call client unit 205 (step S160). After the application activation instruction is transmitted, the application control unit 213 transits to the screen operation input standby state.

If the content checked in step S150 is not an instruction for activating the application but is a disconnection process, the application control unit 213 deletes the screen information from the mobile communication terminal 10 (step S170).

After the screen information of the mobile communication terminal 10 is deleted, the application control unit 213 erases the status (step S180).

(Configuration of Mobile Communication Terminal 30)

A configuration of the mobile communication terminal 30 to be communicated with will be described.

Figure 8:
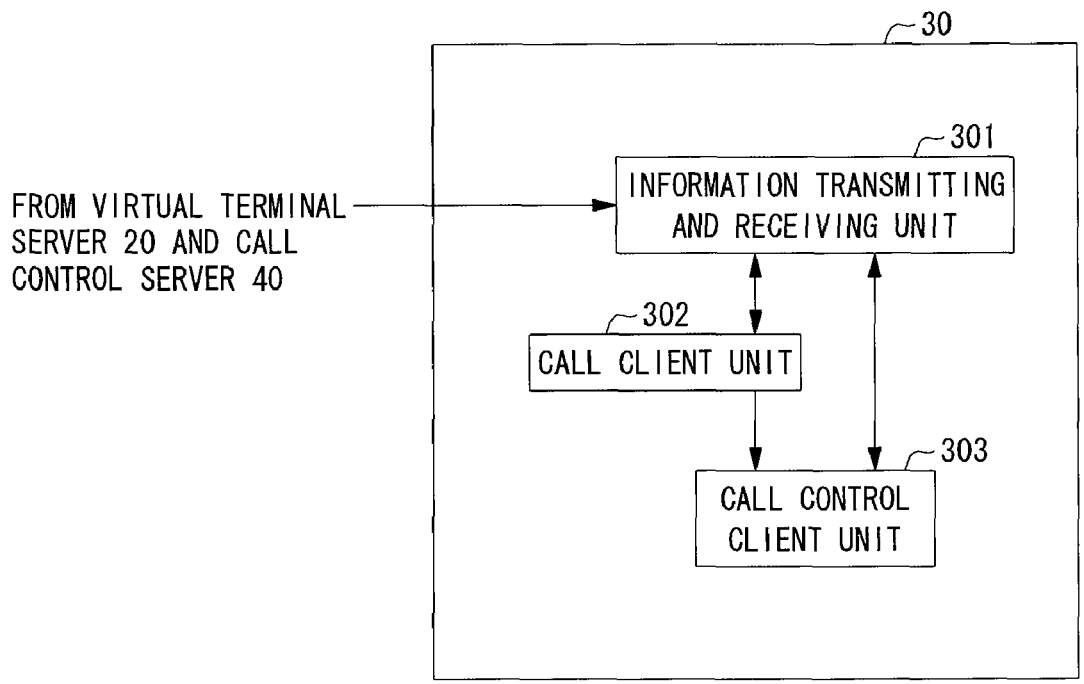
FIG. 8 is a configuration diagram of a communication partner terminal according to the first embodiment of the present invention.

FIG. 8 depicts the configuration of the mobile communication terminal 30 according to one aspect of the present invention.

The mobile communication terminal 30 includes: an information transmitting and receiving unit 301; a call client unit 302; and a call control client unit 303.

The information transmitting and receiving unit 301 transfers audio/screen information received from the virtual terminal server 20 to the call client unit 302. Upon receipt of a communication control message from the call control server 40 and the virtual terminal server 20, the information transmitting and receiving unit 301 transfers the communication control message to the call control client unit 303. However, the communication control message of the communication start instruction is transferred to the call client unit 302. The information transmitting and receiving unit 301 transfers the audio/screen information received from the call client unit 302 to the virtual terminal server 20. The information transmitting and receiving unit 301 further transfers the communication control message received from the call control client unit 303 to the virtual terminal server 20 or the call control server 40.

Upon receipt of the audio/screen information from the information transmitting and receiving unit 301, the call client unit 302 outputs the audio/screen information on the terminal. The call client unit 302 also transfers the audio/screen information inputted from the terminal to the information transmitting and receiving unit 301. Upon receipt of the communication control message at the start of communication, the call client unit 302 transfers the message to the call control client unit 303 to activate the call control client unit 303.

The call control client unit 303 is activated by receiving the communication control message at the start of communication from the call client unit 302. After that, the call control client unit 303 transmits and receives the communication control message to and from the information transmitting and receiving unit 301, and sets a communication path with the virtual terminal server 20.

(Configuration of Call Control Server 40)

A configuration of the call control server 40 will be described.

Figure 9:
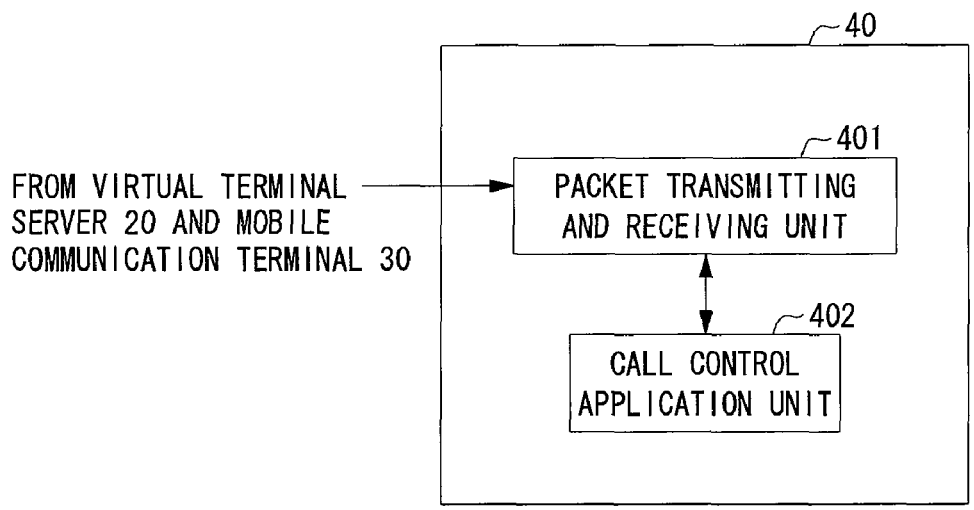
FIG. 9 is a configuration diagram of a call control server 40 as a communication control server according to the first embodiment of the present invention.

FIG. 9 shows the configuration of the call control server 40 according to one aspect of the present invention.

The call control server 40 includes a packet transmitting and receiving unit 401 and a call control application unit 402.

The packet transmitting and receiving unit 401 transmits and receives the communication control message to and from the virtual terminal server 20 and the communication partner mobile communication terminal 30, and transmits the communication control message to the call control application unit 402.

The call control application unit 402 transmits and receives the communication control message to and from the virtual terminal server 20 and the communication partner terminal, and sets a communication path between the two such that the process of corresponding communication application can be executed.

The application is installed in the call control application unit 402 in compliance with the new communication function.

The virtual terminal connection receiving unit 201 constitutes identification information acquiring means. The menu information storing unit 212 and the application control unit 213 constitute activation request acquiring means. The call client unit 205 and the call control client unit 206 constitute a communication control unit. The model discriminating unit 211 and the screen constituting unit 209 constitute screen constituting means. The UI operation information receiving unit 203, the text inputting unit 204, and the application control unit 213 constitute operation processing means. The virtual terminal connection unit 101 constitutes remote connection means. The UI operation information receiving unit 103 and the UI operation information transmitting unit 104 constitute input information transmitting means. The screen display unit 105 constitutes screen display means.

(Operational Example)

An example of the operation of a communication process using the virtual terminal server 20 of the present embodiment will be described with reference to FIG. 10.

A TV telephone will be described as an example of an application (communication service) including a communication function, which is a new service not installed in the mobile communication terminal 10 with a virtual terminal function, and which can be provided by the virtual terminal server 20.

Figure 10:
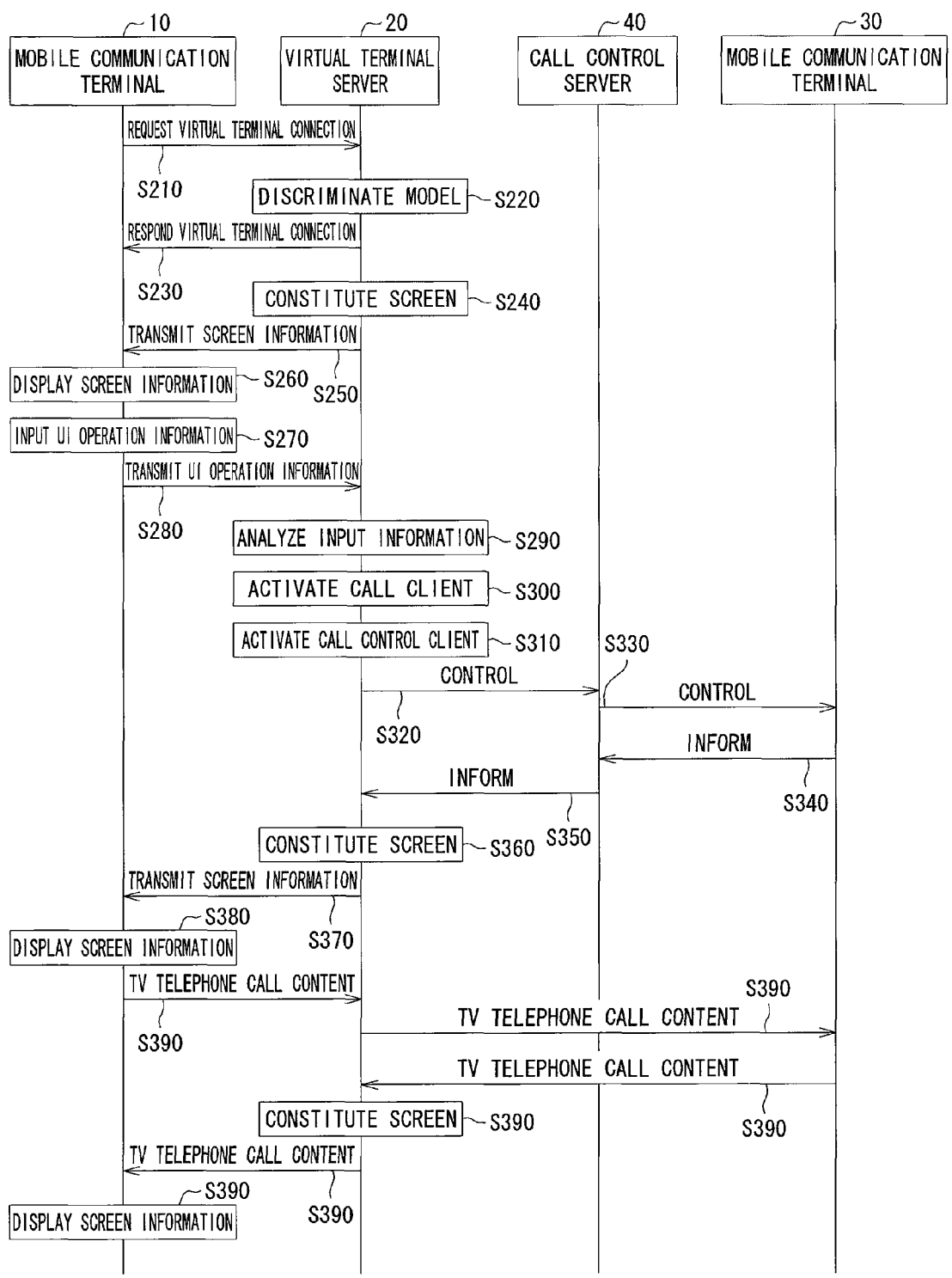
FIG. 10 is a flow chart of an operation from the start to the end of the communication of a TV telephone in the communication control system according to the first embodiment of the present invention.

FIG. 10 shows a flow of an operation from the start of communication to the end thereof of the TV telephone control of the communication control system according to one aspect of the present invention.

To activate the communication control system according to one aspect of the present invention, the mobile communication terminal 10 with a virtual terminal function firstly transmits a virtual terminal connection request to the virtual terminal server 20 (step S210). The mobile communication terminal 10 with a virtual terminal function transmits the identification information such that the virtual terminal server 20 can perform the authentication and discriminate the model of the mobile communication terminal 10.

Upon receipt of the virtual terminal connection request, the virtual terminal server 20 authenticates the mobile communication terminal 10. After authenticating the mobile communication terminal 10 that has transmitted the virtual terminal connection request, the virtual terminal server 20 discriminates the model of the mobile communication terminal 10 based on the identification information (step S220). After discriminating the model, the virtual terminal server 20 creates information on screen specifications.

After completing the discrimination of the model in the process of step S220, the virtual terminal server 20 transmits a virtual terminal connection response to the mobile communication terminal 10 with a virtual terminal function to complete the connection process (step S230). After that, the mobile communication terminal 10 with a virtual terminal function can communicate with the virtual terminal server 20.

The virtual terminal server 20 constitutes a screen of the currently provided service menu (step S240), and transmits the screen information to the mobile communication terminal 10 with a virtual terminal function (step S250).

After receiving the menu screen information from the virtual terminal server 20, the mobile communication terminal 10 with a virtual terminal function displays the information (step S260). This enables receipt of operation input information from the user.

After receiving the input by the user (step S270), the mobile communication terminal 10 with a virtual terminal function transmits the input to the virtual terminal server 20 as UI operation information (step S280).

The mobile communication terminal 10 with a virtual terminal function transmits received operation information of a button to the virtual terminal server 20, when receiving an input from the button, and transmits input information (UI operation information) including location information of a screen, which has received an input, to the virtual terminal server 20 when receiving an input from the screen of a touch panel or the like.

After receiving the UI operation information, the virtual terminal server 20 analyzes the input information and analyzes which service has been selected from the service menu indicating communication functions that can be provided by the virtual terminal server 20 (step S290) A case where a menu displayed by the virtual terminal server 20 is selected has been illustrated in the above description. Text information may also be inputted. In that case, when a text is inputted, the text is identified and provided to a relevant application.

A case where the TV telephone service is selected from the menu will be described.

If the input information is the menu of the TV telephone service in step S290, the virtual terminal server 20 activates a call client (step S300). Originally, the call client is equivalent to an application that is installed in a mobile communication terminal and that provides an audio/TV telephone service. The call client includes a function for transmitting and receiving audio/image information to and from the communication partner.

The virtual terminal server 20 then activates a call control client (step S310). The call control client performs a communication control such as setting a communication path and transmits and receives a communication control message to provide the communication service.

Having activated the call control client, the virtual terminal server 20 controls the TV telephone connection as a communication function selected with the mobile communication terminal 30 in association with the call control server 40 as a communication control server and, establishes communication of the TV telephone (steps S320 to S350).

After the completion of the TV telephone connection with the communication partner mobile communication terminal 30, the virtual terminal server 20 constitutes screen information optimal for the model discriminated in step S220 (step S360).

The screen information indicates image information of the TV telephone of the mobile communication terminal 30 to be communicated with on the application screen of the call client, and the screen is constituted by the size that is optimal for the terminal 10.

The screen information constituted by the virtual terminal server 20 in step S360 is transmitted to the mobile communication terminal 10 with a virtual terminal function (step S370).

When receiving the screen information from the virtual terminal server 20, the mobile communication terminal 10 with a virtual terminal function displays the screen information (step S380). As the transmitted screen information to be displayed by the mobile communication terminal 10 with a virtual terminal function is already in an optimal screen size, the mobile communication terminal 10 with a virtual terminal function simply needs to display the screen information.

After the TV telephone service is started and the TV telephone information of the communication partner is displayed in step S380, the TV telephone service is performed with the communication partner mobile communication terminal 30.
(Effects)

The virtual terminal server 20 activates an application including a communication function, the application being selected by the mobile communication terminal 10 with a virtual terminal function and to which an activation request is issued, and controls the communication connection on behalf of the mobile communication terminal 10 with a virtual terminal function. The configuration enables the provision of a new service even to a conventional mobile communication terminal, by installing the virtual terminal connection unit 101 that outputs a connection request to the virtual terminal server 20 without installing a new function.

In that case, the application included in the communication function to be activated by the virtual terminal server 20 is made clear by presenting a service menu, which can be provided from the virtual terminal server 20, to the mobile communication terminal 10 with a virtual terminal function and selecting the application including the communication function desired by the user of the terminal.

Processing of the screen in compliance with the mobile communication terminal 10 with a virtual terminal function and transmission to the mobile communication terminal 10 with a virtual terminal function allow displaying on the screen of the mobile communication terminal 10 with a virtual terminal function with certainty. In addition, the mobile communication terminal 10 with a virtual terminal function simply displays the received screen, thereby eliminating a process for the display format in compliance with the application including the corresponding communication function in the mobile communication terminal 10 with a virtual terminal function.

Furthermore, The transmission of input information such as button operation information and information indicative of the location of the inputted information within the screen of the mobile communication terminal and the request of the communication control for the virtual terminal server 20 eliminates an operation analysis processes corresponding to the activated communication function in the mobile communication terminal 10 with a virtual terminal function. The virtual terminal server 20 performs these processes.

The screen display and the operation input need not be synchronized.
(Applications and Modifications)

In the above embodiment, a TV telephone service has been illustrated, as an application that is not installed in the mobile communication terminal 10 with a virtual terminal function and that includes a communication function provided by the virtual terminal server 20. However, the present invention is not limited to this.

An audio phone, a supplementary service of an audio telephone or a TV telephone, and a new supplementary service may also be provided.

In that case, the call client and the call control client included in the virtual terminal server 20 are used to provide the audio service. A function is added to the call client unit 205 and the call control client unit 206 to provide the supplementary service or the new supplementary service. Even if a new service is started to be provided in addition to basic services, the configuration enables to provide the service without adding a function to the mobile communication terminal 10.

Preferably, even if a new service is added, the call client and the call control client are made common so as to be utilized by multiple services.

In the above embodiment, the communication of the TV telephone starts, when the mobile communication terminal 10 with a virtual terminal function displays the screen information in step S380. Alternatively, the completion of the TV telephone connection may be informed firstly. More specifically, the completion of the TV telephone connection may be informed to the virtual terminal server 20 when the setting of the network and the communication partner has completed in step S350, and then the screen information may be transmitted from the virtual terminal server 20. In this configuration, it is possible to inform the mobile communication terminal 10 with a virtual terminal function that the TV telephone connection is available promptly.

The communication service can be provided in the above embodiment. However, the present invention is not limited to this. Services such as e-mail and the web may be set available. Thus, in addition to the call client and the call control client, a mail client and a web client are installed as services that can be provided and that include communication functions. This enables the provision of not only the communication service, but also various services.

Although the mail client, the web client, and the like are added as new functions, it is preferable to commonly use the units constituting the virtual terminal server 20 other than the call client unit 205 and the call control client unit 206.

Second Embodiment

The second embodiment will be described with reference to the drawings. The like reference numerals are designated to like devices in the above embodiment.
(Configuration)

The fundamental configuration of the present embodiment is the same as the first embodiment. However, as shown in FIG. 11, the different point is that the mobile communication terminal 30 to be communicated with is also a mobile communication terminal with a virtual terminal function.

In the first embodiment, the description has been given that the mobile communication terminal 30 executes, without connecting to the virtual terminal server 20, a service (application including communication function) process including a communication function that is not installed in the mobile communication terminal with a virtual terminal function such as a TV telephone.

Figure 11:
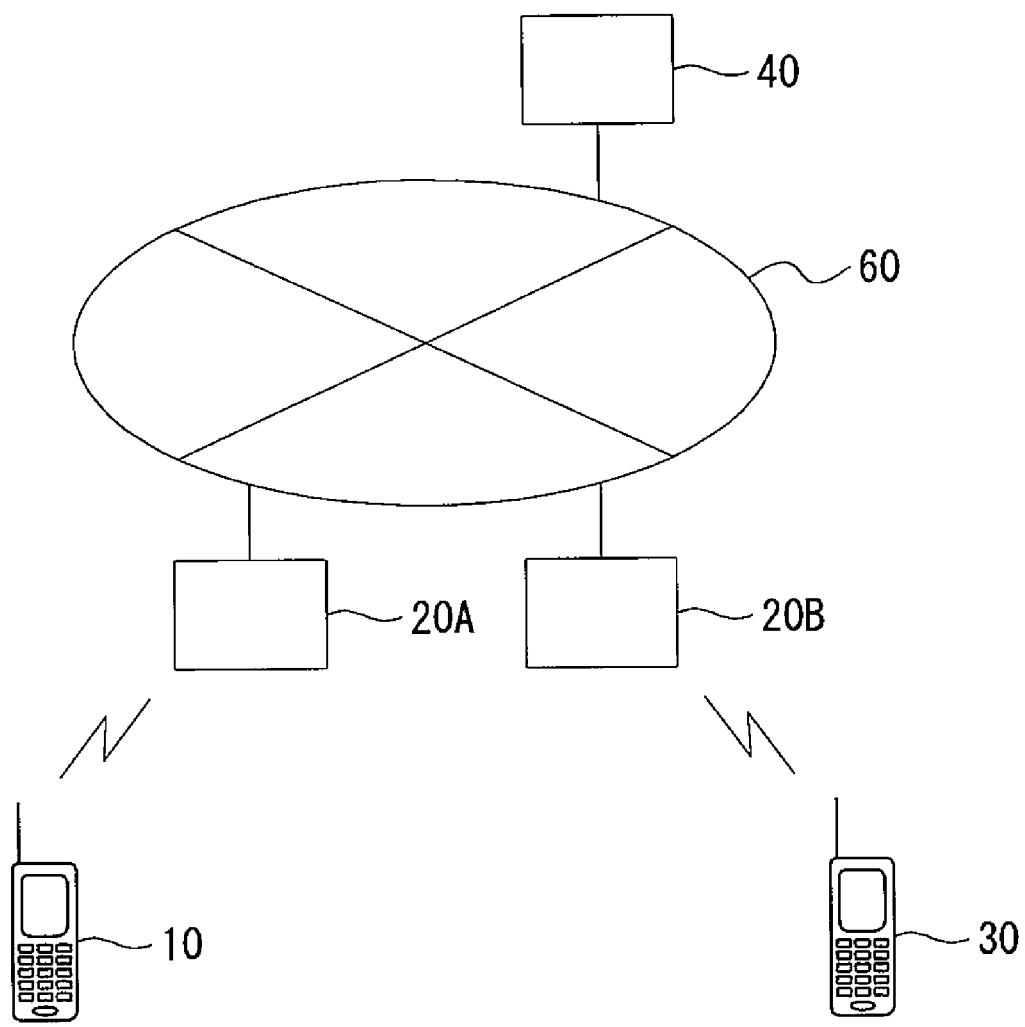
FIG. 11 is a schematic block diagram of the communication control system according to a second embodiment of the present invention.

On the other hand, as shown in FIG. 11, in the second embodiment, an example in which the mobile communication terminal 30 to be communicated with is also connected to a virtual terminal server 20B will be described.

More specifically, the mobile communication terminal 30 to be communicated with is also a mobile communication terminal with a virtual terminal function configured in the same way as the mobile communication terminal 10. The virtual terminal server 20B executes a process for realizing the connection process of the communication control and a new communication function on behalf of the mobile communication terminal.

Although FIG. 11 is illustrates that there are multiple virtual terminal servers 20, only one virtual terminal server 20 may provided. This can be managed by holding a management table of mobile communication terminals that are allowed to be connected.

Other configurations are the same as the first embodiment described above.

Operational Example

An example will be described in which a mobile communication terminal of a calling side and that of a receiving side of the TV telephone are respectively connected to virtual terminal servers 20A and 20B, and the virtual terminal servers 20A and 20B are connected over the network.

Figure 12:
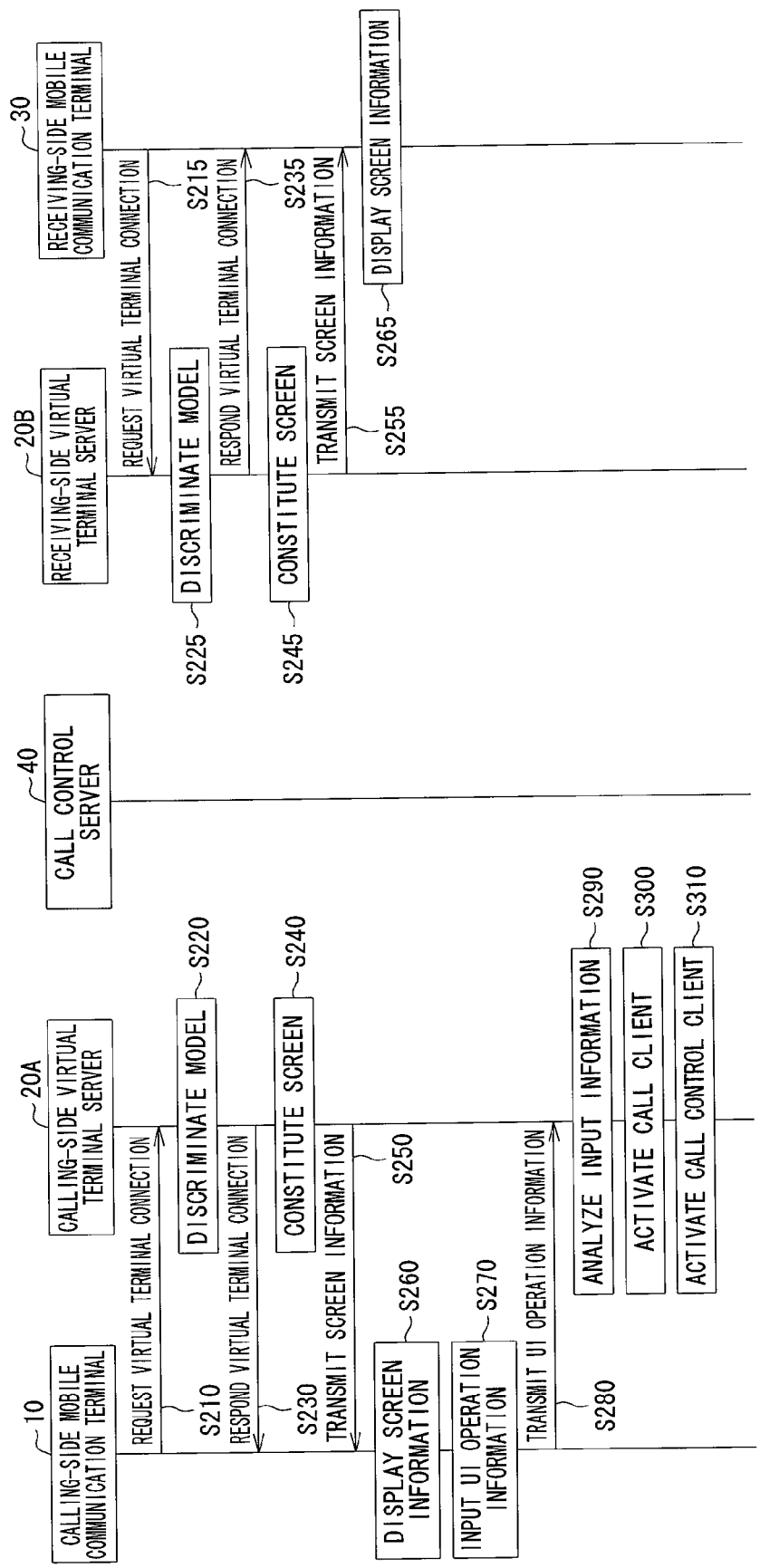
FIG. 12 is a flow chart of an operation from the start to the end of the communication of a TV telephone in the communication control system according to the second embodiment of the present invention.

FIGS. 12 and 13 illustrate an example of a sequence when the mobile communication terminal 30 to be communicated with is also connected to the virtual terminal server 20B. In FIGS. 12 and 13, the mobile communication terminal 30 to be communicated with is described as a receiving-side mobile communication terminal. Although the virtual terminal server 20 of the calling side and that of the receiving side are described as different servers to simplify the description, they may be physically the same virtual terminal server 20.

In the example, the receiving-side mobile communication terminal 30 is connected to the receiving-side virtual terminal server 20B in advance, before receiving a call.

More specifically, the receiving-side mobile communication terminal 30 transmits a virtual terminal connection request to the receiving-side virtual terminal server 20B (step S215). The receiving-side mobile communication terminal 30 transmits the identification information such that the receiving-side virtual terminal server 20B can perform the authentication and discriminate the model.

Upon receipt of the virtual terminal connection request, the receiving-side virtual terminal server 20B authenticates the receiving-side mobile communication terminal 30. After authenticating the mobile communication terminal that has transmitted the virtual terminal connection request, the receiving-side virtual terminal server 20B discriminates the model of the mobile communication terminal based on the identification information (step S225). After discriminating the model, the receiving-side virtual terminal server 20B creates the information on screen specifications.

When the discrimination of the model is completed in the process of step S225, the receiving-side virtual terminal server 20B transmits the virtual terminal connection response to the receiving-side mobile communication terminal 30 and completes the connection process (step S235). After that, the receiving-side mobile communication terminal 30 can communicate with the receiving-side virtual terminal server 20B.

The receiving-side virtual terminal server 20B constitutes a screen of a service menu that is currently provided (step S245) and transmits the screen to the receiving-side mobile communication terminal 30 (step S255).

After receiving the menu screen information from the receiving-side virtual terminal server 20B, the receiving-side mobile communication terminal 30 displays the information (step S265). This enables the receiving-side mobile communication terminal 30 to receive operation input information from the user, the information corresponding to a function not installed in the receiving-side mobile communication terminal 30.

Under the circumstances, the calling-side mobile communication terminal 10 first transmits the virtual terminal connection request to the calling-side virtual terminal server 20A (step S210). The calling-side mobile communication terminal 10 transmits identification information such that the virtual terminal server 20 can perform the authentication and discriminate the model.

Upon receipt of the virtual terminal connection request, the calling-side virtual terminal server 20A authenticates the calling-side mobile communication terminal 10. After authenticating the mobile communication terminal that has transmitted the virtual terminal connection request, the calling-side virtual terminal server 20A discriminates the model of the mobile communication terminal based on the identification information (step S220). After discriminating the model, the virtual terminal server 20A creates the information on screen specifications.

When the discrimination of the model is completed in the process of step S220, the virtual terminal connection response is transmitted to the calling-side mobile communication terminal 10, and the connection process is completed (step S230). After that, the calling-side mobile communication terminal 10 can communicate with the calling-side virtual terminal server 20A.

The calling-side virtual terminal server 20A constitutes a screen of the service menu that is currently provided (step S240), and transmits the screen to the calling-side mobile communication terminal 10 (step S250).

Upon receipt of the menu screen information from the calling-side virtual server 20A, the calling-side mobile communication terminal 10 displays the information (step S260). This enables to receive operation input information from the user.

Upon receipt of an input from the user (step S270), the calling-side mobile communication terminal 10 transmits the input to the calling-side virtual terminal server 20A as UI operation information (step S280).

The calling-side mobile communication terminal 10 and the receiving-side mobile communication terminal 30 transmit, to the virtual terminal server 20, received operation information of a button when receiving an input from the button and transmit location information and the like of a screen that has received an input when receiving the input from the screen such as a touch panel.

Upon receipt of the UI operation information, the calling-side virtual terminal server 20A analyzes the input information and analyzes which service is selected from the service menu indicative of communication functions that can be provided by the calling-side virtual terminal server 20A (step S290). The above description illustrates a case where the menu displayed by the virtual terminal server 20 is selected. Text information may also be inputted. When a text is inputted, the text is identified and provided to a relevant application.

A case where the TV telephone service is selected from the menu will now be described.

The input information is a menu of the TV telephone service in step S290. When a calling-side partner is selected, the calling-side virtual terminal server 20A activates the call client (step S300). Originally, the call client is equivalent to an application that is installed in the mobile communication terminal and that provides an audio/TV telephone service and includes a function for transmitting and receiving audio/image information to and from the communication partner.

The calling-side virtual terminal server 20A then activates the call control client (step S310). The call control client controls the communication for setting a communication path and transmits and receives a communication control message to provide a communication service.

Having activated the call control client, the calling-side virtual terminal server 20A transmits a communication control message for controlling the TV telephone connection to the receiving-side virtual terminal server 20B through the call control server 40 as a communication control server (steps S320 and S330).

The receiving-side virtual terminal server 20B activates the call client (step S305). Originally, the call client is equivalent to an application that is installed in the mobile communication terminal and that provides an audio/TV telephone service. The call client includes a function for transmitting and receiving audio/image information to and from the communication partner.

Subsequently, the receiving-side virtual terminal server 20B activates the call control client (step S315). The call control client controls the communication for setting a communication path and transmits and receives a communication control message to provide a communication service.

The receiving-side virtual terminal server then constitutes an incoming call screen of the TV telephone (step S245) and transmits the screen to the receiving-side mobile communication terminal 30 (step S255).

Upon receipt of the TV telephone incoming call screen information from the receiving-side virtual terminal server 20B, the receiving-side mobile communication terminal 30 displays the information. This enables the receipt of the operation input information from the user. After receiving an input from the user (step S270), the receiving-side mobile communication terminal 30 transmits the input to the receiving-side virtual terminal server 20B as UI operation information (step S285). Information of whether a response to the incoming call is possible is inputted to the UI operation information.

After determining whether the connection is possible, the receiving-side virtual terminal server 20B executes a connection process if determining that the connection is possible (step S400).

Once the connection is completed, the receiving-side virtual terminal server 20B performs a TV telephone connection completion communication to the calling-side virtual terminal server 20A through the call control server 40 to thereby establish the communication of the TV telephone (steps S330 and S350).

After the completion of the TV telephone connection with the receiving-side mobile communication terminal 30, the calling-side virtual terminal server 20A constitutes screen information optimal for the model discriminated in step S220 (step S360).

The screen information indicates image information of the TV telephone of the mobile communication terminal 30 on the application screen of the call client, and the screen is constituted by the size that is optimal for the terminal.

The screen information constituted by the calling-side virtual terminal server 20A in step S360 is transmitted to the calling-side mobile communication terminal 10 (step S370).

Upon receipt of the screen information from the virtual terminal, the calling-side mobile communication terminal 10 displays the information (step S380). As the transmitted screen information to be displayed by the calling-side mobile communication terminal 10 is already in an optimal screen size, the calling-side mobile communication terminal 10 simply needs to display the screen information.

When the TV telephone service is started and the TV telephone information of the communication partner is displayed in step S380, the TV telephone service with the receiving-side mobile communication terminal 30 is performed (steps S390 and S395).

According to one aspect of the configuration, all newly provided services can be provided to the mobile communication terminals 10 and 30 without adding a function.

Configurations of the applications and the modifications described in the first embodiment can also be employed for the second embodiment.

Although the operational example of the second embodiment has been described that the receiving-side mobile communication terminal 30 is connected to the receiving-side virtual terminal server 20B in advance, the present invention is not limited to this. For example, after receiving the communication control message of the connection control from the calling-side virtual terminal server 20A, the receiving-side virtual terminal server 20B may transmit a menu screen, which is for determining whether to make a connection, to a corresponding receiving-side mobile communication terminal 30 to prompt a request (such as an operation request of the virtual terminal connection unit 101) of the connection process from the receiving-side mobile communication terminal 30 to the receiving-side virtual terminal server 20B.

What is claimed is:

1. A virtual terminal server connectable to a mobile communication terminal through a communication network, the virtual terminal server comprising:

an identification information acquiring unit for acquiring identification information on at least one of the mobile communication terminal and a user of the mobile communication terminal from the mobile communication terminal;

an activation request acquiring unit for acquiring activation information on an activation request of an application including a communication function from the mobile communication terminal;

a communication control unit for performing a communication connection control on behalf of the mobile communication terminal to realize the application including the communication function corresponding to the activation information acquired by the activation request acquiring unit;

an application control unit for creating and managing a status of a state transition that indicates to which screen a transition is currently being made for the mobile communication terminal connected to the virtual terminal server, and for checking whether the application is already activated by checking the status of the mobile communication terminal; and a screen constituting unit for, after the application control unit checks that the application is not activated yet, acquiring or generating screen information to be displayed on the mobile communication terminal by executing the application including the communication function, processing the acquired or generated screen information to be suitable for a screen performance of the mobile communication terminal based on the identification information acquired by the identification information acquiring unit, and outputting the screen information to the mobile communication terminal.

2. The virtual terminal server according to claim 1, further comprising an operation processing unit for analyzing, upon receipt of operation information from the mobile communication terminal during the execution of the application including the communication function, the received operation information in accordance with the application that includes the communication function being performed, and executing a process in accordance with an analysis result.

3. The virtual terminal server according to claim 1, wherein the activation request acquiring unit transmits, to a mobile communication terminal, information of the application including the communication function that can be provided in accordance with a request from the mobile communication terminal, and acquires selection information from the mobile communication terminal to thereby acquire activation information of the application including the communication function to which the request is given.

4. A mobile communication terminal connectable to the virtual terminal server according to claim 1, the mobile communication terminal comprising:

a remote connection unit for outputting to the virtual terminal server a connection request for an application including a communication function not installed in a calling-side mobile communication terminal;

an input information transmitting unit for transmitting to the virtual terminal server operation information including at least one of button operation information and information indicative of a location on a screen of the calling-side mobile communication terminal related to acquired information; and a screen display unit for displaying the screen information received from the virtual terminal server.

5. A communication control system comprising:

the virtual terminal server according to claim 1;

a mobile communication terminal that is connected to the virtual terminal server through a communication network and that entrusts to the virtual terminal server a communication control of a communication function not included in a calling-side mobile communication terminal; and a communication control server that controls the connection between the virtual terminal server and another mobile communication terminal.

6. A communication control method in a communication control system comprising a virtual terminal server connectable to a mobile communication terminal through a communication network, the communication control method comprising:

acquiring identification information on at least one of the mobile communication terminal and a user of the mobile communication terminal from the mobile communication terminal;

acquiring activation information on an activation request of an application including a communication function from the mobile communication terminal;

performing a communication connection control on behalf of the mobile communication terminal to realize the application including the communication function corresponding to the activation information acquired in the acquiring of the activation information;

creating and managing a status of a state transition that indicates to which screen a transition is currently being made for the mobile communication terminal connected to the virtual terminal server, and checking whether the application is already activated by checking the status of the mobile communication terminal; and after it is checked that the application is not activated yet, acquiring or generating screen information to be displayed on the mobile communication terminal by executing the application including the communication function, processing the acquired or generated screen information to be suitable for a screen performance of the mobile communication terminal based on the identification information acquired in the acquiring of the identification information, and outputting the screen information to the mobile communication terminal.

\* \* \* \* \*